(12) United States Patent
Isele et al.

(10) Patent No.: US 11,708,092 B2
(45) Date of Patent: Jul. 25, 2023

(54) LANE SELECTION

(71) Applicant: Honda Motor Co., Ltd., Tokyo (JP)

(72) Inventors: David Francis Isele, Sunnyvale, CA (US); Kikuo Fujimura, Palo Alto, CA (US); Sangjae Bae, Berkley, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 174 days.

(21) Appl. No.: 17/121,081

(22) Filed: Dec. 14, 2020

(65) Prior Publication Data

US 2022/0185326 A1 Jun. 16, 2022

(51) Int. Cl.
| | |
|---|---|
| *B60W 60/00* | (2020.01) |
| *G08G 1/16* | (2006.01) |
| *G01C 21/34* | (2006.01) |
| *B60W 30/09* | (2012.01) |
| *B60W 50/00* | (2006.01) |
| *B60W 10/20* | (2006.01) |
| *B60W 30/18* | (2012.01) |
| *B60W 30/095* | (2012.01) |

(52) U.S. Cl.
CPC ........ *B60W 60/0015* (2020.02); *B60W 10/20* (2013.01); *B60W 30/09* (2013.01); *B60W 30/0956* (2013.01); *B60W 30/18163* (2013.01); *B60W 50/0097* (2013.01); *B60W 60/0027* (2020.02); *G01C 21/3453* (2013.01); *G08G 1/166* (2013.01); *G08G 1/167* (2013.01)

(58) Field of Classification Search
CPC ........ B60W 60/0027; B60W 60/0011; B60W 2552/53; B60W 2554/4045; B60W 2552/10; G08G 1/0133; G08G 1/0145; G08G 1/167

See application file for complete search history.

(56) References Cited

U.S. PATENT DOCUMENTS

| | | | | |
|---|---|---|---|---|
| 2019/0391580 A1* | 12/2019 | Di Cairano | .......... | G05D 1/0217 |
| 2021/0253128 A1* | 8/2021 | Nister | .......... | G06N 3/08 |
| 2021/0347382 A1* | 11/2021 | Huang | .......... | G01C 21/3453 |

OTHER PUBLICATIONS

Moura et al, "Risk-Aware Lane Selection on Highway with Dynamic Obstacles", Jul. 2021, 2021 IEEE Intelligent Vehicles Symposium, DOI 10.1109/IV48863.2021.9575610 (Year: 2021).*

(Continued)

*Primary Examiner* — Tarek Elarabi
(74) *Attorney, Agent, or Firm* — Rankin, Hill & Clark LLP

(57) ABSTRACT

According to one aspect, systems and techniques for lane selection may include receiving a current state of an ego vehicle and a traffic participant vehicle, and a goal position, projecting the ego vehicle and the traffic participant vehicle onto a graph network, where nodes of the graph network may be indicative of discretized space within an operating environment, determining a current node for the ego vehicle within the graph network, and determining a subsequent node for the ego vehicle based on identifying adjacent nodes which may be adjacent to the current node, calculating travel times associated with each of the adjacent nodes, calculating step costs associated with each of the adjacent nodes, calculating heuristic costs associated with each of the adjacent nodes, and predicting a position of the traffic participant vehicle.

19 Claims, 7 Drawing Sheets

(56) References Cited

OTHER PUBLICATIONS

S. Bae, D. Saxena, A. Nakhaei, C. Choi, K. Fujimura, and S. Moura, "Cooperation-aware lane change maneuver in dense traffic based on model predictive control with recurrent neural network," in 2020 American Control Conference (ACC). IEEE, 2020, pp. 1209-1216.
P. T. Boggs and J. W. Tolle, "Sequential quadratic programming," Acta numerica, vol. 4, No. 1, pp. 1-51, 1995.
C. Choi, A. Patil, and S. Malla, "Drogon: A causal reasoning framework for future trajectory forecast," arXiv preprint arXiv:1908.00024, 2019.
A. Dosovitskiy, G. Ros, F. Codevilla, A. Lopez, and V. Koltun, "Carla: An open urban driving simulator," arXiv preprint arXiv:1711.03938, 2017.
R. M. Gray, Entropy and information theory. Springer Science & Business Media, 2011.
A. Gupta, J. Johnson, L. Fei-Fei, S. Savarese, and A. Alahi, "Social gan: Socially acceptable trajectories with generative adversarial networks," in Proceedings of the IEEE Conference on Computer Vision and Pattern Recognition, 2018, pp. 2255-2264.
P. E. Hart, N. J. Nilsson, and B. Raphael, "A formal basis for the heuristic determination of minimum cost paths," IEEE transactions on Systems Science and Cybernetics, vol. 4, No. 2, pp. 100-107, 1968.
A. Kesting, M. Treiber, and D. Helbing, "Enhanced intelligent driver model to access the impact of driving strategies on traffic capacity," Philosophical Transactions of the Royal Society A: Mathematical, Physical and Engineering Sciences, vol. 368, No. 1928, pp. 4585-4605, 2010.
D. Isele, "Interactive decision making for autonomous vehicles in dense traffic," in 2019 IEEE Intelligent Transportation Systems Conference (ITSC). IEEE, 2019, pp. 3981-3986.
S. M. LaValle, "Rapidly-exploring random trees: A new tool for path planning," 1998.
G. Liu, S. Chen, Z. Zeng, H. Cui, Y. Fang, D. Gu, Z. Yin, and Z. Wang, "Risk factors for extremely serious road accidents: Results from national road accident statistical annual report of china," PLoS one, vol. 13, No. 8, p. e0201587, 2018.
M. McNaughton, C. Urmson, J. M. Dolan, and J.-W. Lee, "Motion planning for autonomous driving with a conformal spatiotemporal lattice," in 2011 IEEE International Conference on Robotics and Automation. IEEE, 2011, pp. 4889-4895.
D. Sadigh, S. Sastry, S. A. Seshia, and A. D. Dragan, "Planning for autonomous cars that leverage effects on human actions." in Robotics: Science and Systems, vol. 2 Ann Arbor, MI, USA, 2016.
G. Schildbach and F. Borrelli, "Scenario model predictive control for lane change assistance on highways," in 2015 IEEE Intelligent Vehicles Symposium (IV). IEEE, 2015, pp. 611-616.
W. Schwarting, A. Pierson, J. Alonso-Mora, S. Karaman, and D. Rus, "Social behavior for autonomous vehicles," Proceedings of the National Academy of Sciences, vol. 116, No. 50, pp. 24 972-24 978, 2019.
M. Treiber, A. Hennecke, and D. Helbing, "Congested traffic states in empirical observations and microscopic simulations," Physical review E, vol. 62, No. 2, p. 1805, 2000.
S. J. Anderson, S. C. Peters, T. E. Pilutti, and K. Iagnemma, "An optimal-control-based framework for trajectory planning, threat assessment, and semi-autonomous control of passenger vehicles in hazard avoidance scenarios," International Journal of Vehicle Autonomous Systems, vol. 8, No. 2-4, pp. 190-216, 2010.
I. Barabás, A. Todoruţ, N. Cordoş, and A. Molea, "Current challenges in autonomous driving," in IOP conference series: materials science and engineering, vol. 252, No. 1. IOP Publishing, 2017, p. 012096.
G. E. Box and G. C. Tiao, Bayesian inference in statistical analysis. John Wiley & Sons, 1992, vol. 40.
G. Cesari, G. Schildbach, A. Carvalho, and F. Borrelli, "Scenario model predictive control for lane change assistance and autonomous driving on highways," IEEE Intelligent transportation systems magazine, vol. 9, No. 3, pp. 23-35, 2017.
J.-C. Chen, "Dijkstra's shortest path algorithm," Journal of Formalized Mathematics, vol. 15, No. 9, pp. 237-247, 2003.
Y. Chen, C. Hu, and J. Wang, "Motion planning with velocity prediction and composite nonlinear feedback tracking control for lane-change strategy of autonomous vehicles," IEEE Transactions on Intelligent Vehicles, vol. 5, No. 1, pp. 63-74, 2019.
C. Choi, A. Patil, and S. Malla, "Drogon: A trajectory prediction model based on intention-conditioned behavior reasoning," Proceedings of the Conference on Robot Learning, 2020.
A. Gray, Y. Gao, J. K. Hedrick, and F. Borrelli, "Robust predictive control for semi-autonomous vehicles with an uncertain driver model," in 2013 IEEE intelligent vehicles symposium (IV). IEEE, 2013, pp. 208-213.
A. Gritsenko, "Learning from demonstrations in changing environments: Learning cost functions and constraints for motion planning," Learning, vol. 2015, pp. 09-08, 2015.
A. Kesting, M. Treiber, and D. Helbing, "General Lane-Changing Model MOBIL for Car-Following Models", Transportation Research Record 1999.1 (2007): 86-94.
S. Khandelwal, W. Qi, J. Singh, A. Hartnett, and D. Ramanan, "What-if motion prediction for autonomous driving," arXiv preprint arXiv:2008.10587, 2020.
K. Okamoto, K. Berntorp, and S. Di Cairano, "Similarity-based vehicle-motion prediction," in 2017 American Control Conference (ACC). IEEE, 2017, pp. 303-308.
P. Olsen, "Cadillac tops tesla in consumer reoprts' first ranking of automated driving sytems," Consum. Rep, 2018.
S. Scherer and S. Singh, "Multiple-objective motion planning for unmanned aerial vehicles," in 2011 IEEE/RSJ International Conference on Intelligent Robots and Systems. IEEE, 2011, pp. 2207-2214.
J. Suh, H. Chae, and K. Yi, "Stochastic model-predictive control for lane change decision of automated driving vehicles," IEEE Transactions on Vehicular Technology, vol. 67, No. 6, p. 4771-4782, 2018.
C. Zammit and E.-J. Van Kampen, "Comparison between a* and rrt algorithms for uav path planning," in 2018 AIAA guidance, navigation, and control conference, 2018, p. 1846.
Office Action of U.S. Appl. No. 17/229,126 dated Feb. 7, 2023, 31 pages.

\* cited by examiner

TABLE I
TRAFFIC CONFIGURATION OF EACH LANE

LANE SELECTION

BACKGROUND

Lane changing may be considered a challenging driving behavior, as a lane change may require multi-directional perceptions and predictions associated with other drivers, as well as timely decision making. An aggressive lane changing maneuver without carefully observing other vehicles' maneuvers may cause collisions with surrounding vehicles.

Nevertheless, if lane changing is executed at the right moment, lane changing often significantly helps reducing a travel time, securing a wider visibility range, and increasing safety of driving on upcoming routes. Consider being stuck behind a slow moving vehicle on the highway. One strategy that maintains the current lane may introduce travel delays. However, changing lanes may disrupt other traffic participants and introduce a risk.

BRIEF DESCRIPTION

According to one aspect, a system for lane selection may include a memory and a processor coupled to the memory, the processor executing instructions stored in the memory. The instructions may include receiving a current state of an ego vehicle, a current state of a traffic participant vehicle, and a goal position for the ego vehicle within an operating environment, projecting the ego vehicle and the traffic participant vehicle onto a graph network based on the current state of the ego vehicle and the current state of the traffic participant vehicle, where one or more nodes of the graph network may be indicative of discretized space within the operating environment, determining a current node for the ego vehicle within the graph network, and determining a subsequent node for the ego vehicle based on the following: identifying one or more adjacent nodes which may be adjacent to the current node, calculating one or more travel times associated with each of the one or more adjacent nodes, calculating one or more step costs associated with each of the one or more adjacent nodes, calculating one or more heuristic costs associated with each of the one or more adjacent nodes, and predicting a position of the traffic participant vehicle.

The instructions may include determining the subsequent node for the ego vehicle based on calculating one or more total costs associated with each of the one or more adjacent nodes. One or more total costs associated with each of the one or more adjacent nodes may be a sum of one or more of the step costs associated with each of the one or more adjacent nodes and one or more of the heuristic costs associated with each of the one or more adjacent nodes, respectively. One or more of the step costs associated with each of the one or more adjacent nodes may be indicative of an immediate cost of transitioning from the current node to each of the one or more adjacent nodes, respectively. One or more of the heuristic costs associated with each of the one or more adjacent nodes may be indicative of an estimated optimal cost-to-go to the goal position. One or more of the step costs associated with each of the one or more adjacent nodes may include a control effort, a travel time, a risk, and a switching cost. The control effort may be determined based on a Euclidean distance between the current node and the corresponding adjacent node onto a horizontal axis and a vertical axis. The travel time may be determined based on the current state of the ego vehicle including a current velocity of the ego vehicle. The risk may be determined based on the current state of the traffic participant vehicle relative to the current state of the ego vehicle and an amount of vacillation associated with the traffic participant vehicle. The switching cost may be determined based on a function of divergence of an initial position of the ego vehicle from a previous target lane.

According to one aspect, a system for lane selection, may include a memory and a processor coupled to the memory, the processor executing instructions stored in the memory. The system for lane selection may include a controller controlling one or more vehicle systems to steer an ego vehicle from a current node to a subsequent node. The instructions may include receiving a current state of an ego vehicle, a current state of a traffic participant vehicle, and a goal position for the ego vehicle within an operating environment, projecting the ego vehicle and the traffic participant vehicle onto a graph network based on the current state of the ego vehicle and the current state of the traffic participant vehicle, where one or more nodes of the graph network may be indicative of discretized space within the operating environment, determining a current node for the ego vehicle within the graph network, and determining a subsequent node for the ego vehicle based on the following: identifying one or more adjacent nodes which may be adjacent to the current node, calculating one or more travel times associated with each of the one or more adjacent nodes, calculating one or more step costs associated with each of the one or more adjacent nodes, calculating one or more heuristic costs associated with each of the one or more adjacent nodes, and predicting a position of the traffic participant vehicle.

One or more of the step costs associated with each of the one or more adjacent nodes may include a control effort, a travel time, a risk, and a switching cost. The control effort may be determined based on a Euclidean distance between the current node and the corresponding adjacent node onto a horizontal axis and a vertical axis. The travel time may be determined based on the current state of the ego vehicle including a current velocity of the ego vehicle. The risk may be determined based on the current state of the traffic participant vehicle relative to the current state of the ego vehicle and an amount of vacillation associated with the traffic participant vehicle. The switching cost may be determined based on a function of divergence of an initial position of the ego vehicle from a previous target lane.

According to one aspect, a computer-implemented method for lane selection may include: receiving a current state of an ego vehicle, a current state of a traffic participant vehicle, and a goal position for the ego vehicle within an operating environment, projecting the ego vehicle and the traffic participant vehicle onto a graph network based on the current state of the ego vehicle and the current state of the traffic participant vehicle, where one or more nodes of the graph network may be indicative of discretized space within the operating environment, determining a current node for the ego vehicle within the graph network, and determining a subsequent node for the ego vehicle based on the following: identifying one or more adjacent nodes which may be adjacent to the current node, calculating one or more travel times associated with each of the one or more adjacent nodes, calculating one or more step costs associated with each of the one or more adjacent nodes, calculating one or more heuristic costs associated with each of the one or more adjacent nodes, and predicting a position of the traffic participant vehicle.

The computer-implemented method for lane selection may include determining the subsequent node for the ego vehicle based on calculating one or more total costs associated with each of the one or more adjacent nodes, determining one or more total costs associated with each of the one or more adjacent nodes as a sum of one or more of the step costs associated with each of the one or more adjacent nodes and one or more of the heuristic costs associated with each of the one or more adjacent nodes, respectively, and controlling one or more vehicle systems to steer the ego vehicle from the current node to the subsequent node

DETAILED DESCRIPTION

Figure 1:
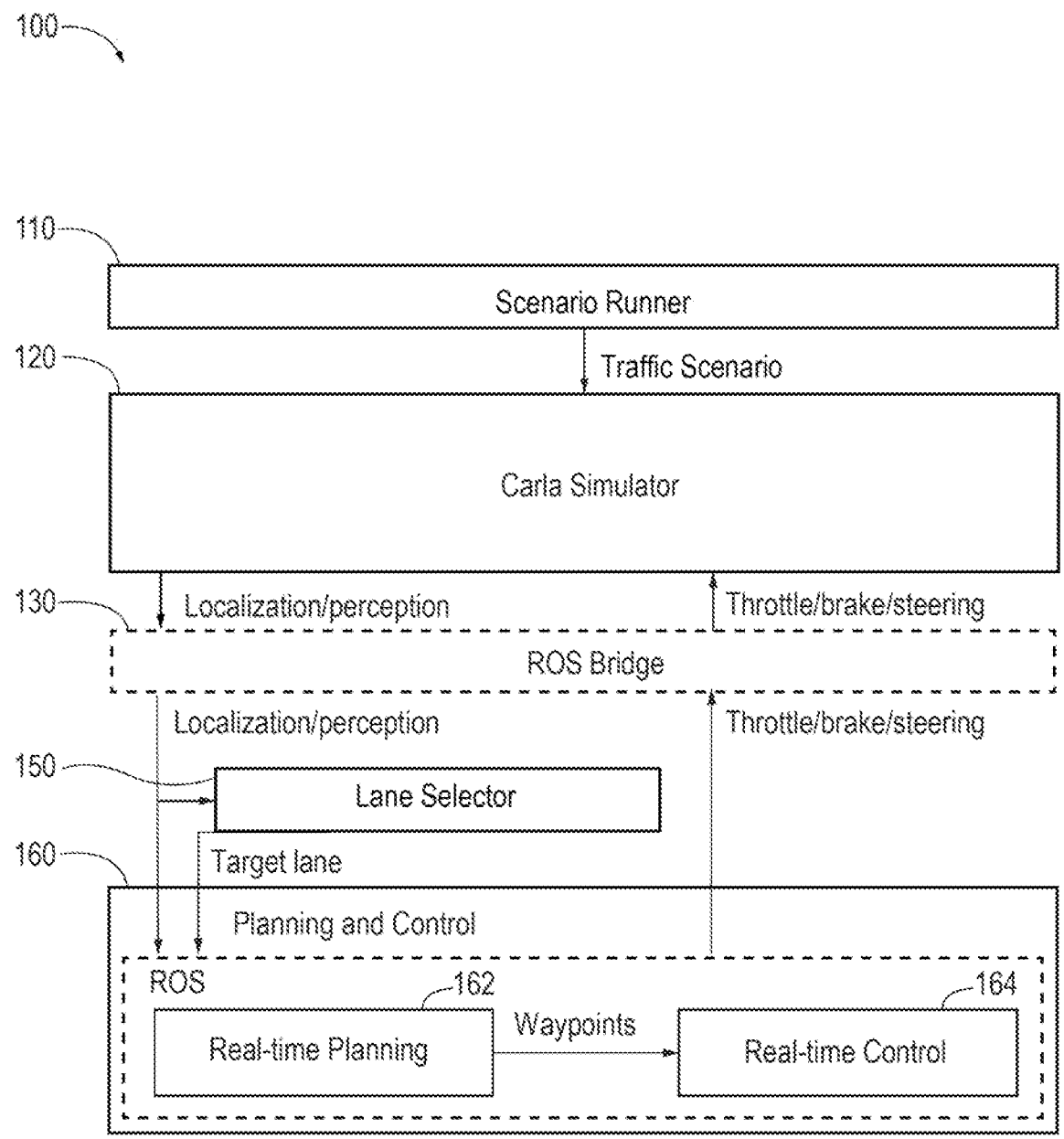
FIG. 1 is an exemplary schematic diagram of a system for lane selection, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary schematic diagram of a system for lane selection, according to one aspect. The system for lane selection of FIG. 1 may include a scenario runner 110, a Car Learning to Act (CARLA) simulator 120, a robot operating system (ROS) bridge 130, a lane selector 150, and a controller 160. The controller may include a real-time planner 162 and a real-time controller 164.

According to one aspect, the lane selection may be implemented as a discretionary lane selection algorithm by the system for lane selection. In particular, highway driving may be considered as a targeted scenario, where each lane has a different level of traffic flow. When lane changing is discretionary, it may be advised not to change lanes unless highly beneficial, e.g., reducing travel time significantly or securing higher safety. Evaluating such "benefit" may be a challenge, along with multiple surrounding vehicles in dynamic speed and heading with uncertainty. There may be a real time lane selection algorithm with careful cost considerations and with a modularity in design. The algorithm may include a search based optimization that evaluates uncertain dynamic positions of other vehicles under a continuous time and space domain. A motion planner framework (e.g., Neural Networks Integrated Model Predictive Control) under the CARLA simulation environment may be included.

Because various traffic participant vehicles have different, often unknown objectives, and these objectives may be in conflict, there may be a desire to negotiate unstructured situations (for example merging in dense traffic). This negotiation requires an agent to both indicate its own intentions and interpret and respond to the intentions of others. Due to the high computation costs and large amounts of uncertainty, these behaviors typically only plan over a short time horizon.

Hence, the system for lane selection focuses on a standalone long horizon strategic decision making process that carefully estimates benefits of lane changing to each lane and that may be coupled with the more computationally demanding negotiation behaviors. By incorporating long horizon strategies, an agent (e.g., or ego vehicle) may potentially avoid challenging interactions or the scene may be configured so that the agent has sufficient time or a favorable position to handle a scenario.

The system for lane selection provides many benefits and advantageous effects. For example, a first challenge to designing a standalone lane selector or system for lane selection may relate to cost formulations. In a scenario where there are three possible lane choices (i.e., lane changing to left, keeping the current lane, and lane changing to right), each lane may be associated with unique situation or scenario, (e.g., a volatile vehicle in the right lane, a slow vehicle in the center lane, and small inter vehicle gap in the left lane). According to this example, the cost formulation may comprehensively cover travel time, efforts to change lanes, and risks associated to limited space and volatility.

A second challenge to designing the system for lane selection may relate to predictions associated with other vehicles' positions. Each vehicle may be different and the other traffic participant vehicle may have a complex decision making mechanism.

Therefore, the lane selector or the system for lane selection may be a flexible place holder of various prediction modules, each of which may be effective in unique situations.

A third challenge to designing the system for lane selection may relate to computational efficiency. The decision making process during lane changing generally should be timely executed, and therefore the computation for lane selection should be prompt. Considering the lane selection as a long horizon planning with multiple lane options, a choice of problem structure and algorithm may be utilized in securing real time computation efficiency.

The system for lane selection described herein may provide a contribution of designing and providing a cost function under a search based optimization method A*, and extending the method so that dynamic obstacles may be systematically evaluated (e.g., implemented by speeding up Dijkstra's algorithm). Additionally, the system for lane selection may have modular framework, so that any choice of prediction models (e.g., for other vehicles) and motion planners may be accommodated under a certain condition. Thus the challenges associated with cost formulation and computational efficiency may be addressed. In this way, the system for lane selection may integrate a motion planner design and demonstrate a complete pipeline of autonomous lane changing.

A. Graph Network

According to one aspect, the processor may receive a current state of an ego vehicle, a current state of a traffic participant vehicle, and a goal position for the ego vehicle within an operating environment. The processor may project the ego vehicle and the traffic participant vehicle onto a graph network based on the current state of the ego vehicle and the current state of the traffic participant vehicle. One or more nodes of the graph network may be indicative of discretized space within the operating environment. The processor may determine an initial node and a current node (e.g. node 0) for the ego vehicle within the graph network. An exemplary graph network is described herein with respect to FIG. 4.

The ego vehicle and the traffic participant vehicle may be initialized on the graph network. According to one aspect, given a road angle t), each position (x,y) may be rotated clockwise so that a direction of travel for the lanes may be set to eastbound (e.g., travel from left to right).

$$x^r = x \cos \psi + y \sin \psi,$$

$$y^r = x \sin \psi - y \cos \psi \quad (1)$$

This alignment enables the processor to perform indexing in a straightforward manner.

The processor may shift the rotated position $(x^r, y^r)$ and project the rotated position onto a relative space. For the ego vehicle's position $(x_{ego}^r, y_{ego}^r)$, the longitudinal position may be set to 0 (i.e., $\tilde{x}_{ego} = 0$), which may be a shifted position by $x_{ego}^r$. Similarly, vehicle i's longitudinal position may be also shifted by $x_{ego}^r$, i.e., $\tilde{x}_i = x_i^r - x_{ego}^r$. The lateral position of the ego vehicle may be rounded to the nearest node and shifted by the leftmost lane $y_{lane,1}^r$.

$$\tilde{y}_{ego} = y^r_{lane,j_*} - y^r_{lane,1}, \quad (2)$$

$$j_* = \underset{j \in J}{\operatorname{argmin}} |y^r_{lane,j} - y^r_{ego}|, \quad (3)$$

with a set of lane numbers J. The lane numbers may be in the ascending order, $\{1, 2, \ldots N_{lane}\}$, from the leftmost lane. This projection may reduce dimensions, keep nodes evenly distributed with constant step size, and make analysis more straightforward. However, this may result in an offset between the original position and projected position.

This offset may yield a reverting behavior while the ego vehicle may be changing lanes if the offset is not evaluated systematically to address this offset in the cost formulation.

For the other vehicles, a lateral position may be projected, relative to a lane width $l_{lane}$, and shifted by the leftmost lane. Formally, for vehicle $i \in \{1, \ldots, N_{veh}\}$, $$\tilde{y}_i = \frac{(y^r_i - y^r_{lane,1})}{l_{lane}} \quad (4)$$

Again, the lateral position of the other traffic participant vehicles may be in a continuous space, and no offset may exist between the original position and projected position.

B. Cost Formulation

The processor may determine a subsequent node for the ego vehicle based on identifying one or more adjacent nodes which may be adjacent to the current node, calculating one or more travel times associated with each of the one or more adjacent nodes, calculating one or more step costs associated with each of the one or more adjacent nodes, calculating one or more heuristic costs associated with each of the one or more adjacent nodes, and predicting a position of the traffic participant vehicle.

The processor may determine the subsequent node for the ego vehicle by calculating one or more total costs associated with each of the one or more adjacent nodes. One or more total costs associated with each of the one or more adjacent nodes may be a sum of one or more of the step costs associated with each of the one or more adjacent nodes and one or more of the heuristic costs associated with each of the one or more adjacent nodes, respectively.

According to one aspect, the processor may perform lane selection by framing optimization of the cost as an A* search. The total cost f at each node n inherited from node $n_0$ may include the step cost g and heuristic cost h.

$$f(n|n_0) = g(n|n_0) + h(n) \quad (5)$$

The step cost g may thus represent an immediate cost of transitioning from one node to another and the heuristic cost h may thus represent an approximate optimal cost-to-go to the goal. Each cost h and g is described in greater detail herein.

B.1. Step Cost

One or more of the step costs associated with each of the one or more adjacent nodes may be indicative of an immediate cost of transitioning from the current node to each of the one or more adjacent nodes, respectively. In other words, the step cost may be indicative of a cost associated with the distance to be travelled from the current node to the adjacent node to be processed. Stated another way, step cost g represents an immediate cost of transitioning from one node to another. One or more of the step costs associated with each of the one or more adjacent nodes may include a control effort, a travel time, a risk, and a switching cost, which may be implemented as four distinctive penalties or penalty functions.

B.1.1. Step Cost: Control Effort

The control effort may be determined by the processor based on a Euclidean distance between the current node and the corresponding adjacent node onto a horizontal axis and a vertical axis.

According to one aspect, the longitudinal and lateral movement may be represented as control efforts by the processor, and the control efforts may be evaluated as a projection of a distance between the nodes onto the horizontal and vertical axis. From node $n_0$ to n, the penalty function on the control effort may be expressed as:

$$g_{control}(n|n_0) = \lambda_{lng}|d(n_0,n)\cos(\theta) + |\kappa_{lat}|d(n_0,n)\sin(\theta) \quad (6)$$

where $\lambda$ denotes weights, $d(n_0,n)$ denotes a Euclidean distance from node $n_0$ to node n, and $\theta$ may be a relative angle of the transition maneuver to the lane angle. The relative angle $\theta$ may be uniquely defined in two distinguished cases (i.e., whether the transition is on the same horizontal level or not on the same horizontal level). Equation (6) thereby includes a longitudinal component (cos) and a lateral component (sin).

$$\theta = \begin{cases} \arctan\left(\frac{l_{lane}}{v}\right), & \text{if } \tilde{y}_{n_0} = \tilde{y}_n \\ \arctan\left(\frac{0}{v}\right) = 0, & \text{if } \tilde{y}_{n_0} \neq \tilde{y}_n \end{cases} \quad (7)$$

where $\tilde{y}_{n_0}$ and $\tilde{y}_n$ denote a projected lateral position of node $n_0$ and node n. Because lane changing behavior may be risky, the lateral control may be penalized more significantly than the longitudinal control. In this regard, the processor may impose a high weight on the lateral control compared to longitudinal control, i.e., $\lambda lat \gg \lambda lng$. Equation (7) describes the specific angle being utilized B.1.2. Step Cost: Travel Time The travel time may be determined by the processor based on the current state of the ego vehicle including a current velocity of the ego vehicle. Reduced travel time may often be a main motivation of lane changing, and hence included as part in the cost function. Given a current speed v, the transition time in seconds from node $n_0$ to node n may be written as:

$$t(n_0, n) = \frac{d(n_0, n)}{v}, \quad (8)$$

The distance $d(n_0,n)$ depends on the lateral position of the nodes, since the distance step may be not identical between longitudinal and lateral directions. If node n is in the same lateral position of node $n_0$:

$$t(n_0, n) = \frac{v}{v} = 1, \quad (9)$$

with v in the unit of [m/s]. If node n is not in the same lateral position of node $n_0$, $$t(n_0, n) = \frac{\frac{\sqrt{(l_{lane})^2 + (v)^2}}{v}}{v} = \frac{\sqrt{(l_{lane})^2 + (v)^2}}{v^2} \quad (10)$$

Thus, from node $n_0$ to node n the penalty function on the travel time may be:

$$g_{time}(n \mid n_0) = \lambda_{time} t(n_0, n) \quad (11)$$

$$= \begin{cases} \lambda_{time}, & \text{if } \tilde{y}_{n_0} = \tilde{y}_n \\ \lambda_{time} \frac{\sqrt{(l_{lane})^2 + (v)^2}}{v^2}, & \text{if } \tilde{y}_{n_0} \neq \tilde{y}_n \end{cases} \quad (12)$$

Equation (12) may be indicative of an additional distance or cost associated with changing lanes (e.g., due to additional time and/or distance travelled).

The processor may evaluate additional travel time due to a slow vehicle up front. If the front vehicle speed $v_f$ is less than the ego vehicles vehicle speed. Assuming that the ego vehicle follows the speed of the front vehicle (i.e., the vehicle in front of the ego vehicle), and the reduced speed may be penalized in the form of additional travel time $t_{add}(n_0,n)$:

$$t_{add}(n_0, n) = \frac{v - v_f}{d(n_0, n)} \quad (13)$$

If the front vehicle is faster than the ego vehicle, (i.e., $<v_f$), the additional travel time may become a negative cost, thereby encouraging the ego vehicle to stay on the same lateral position with node n. Equation (14) may be utilized by the processor to calculate an estimated travel time from one node to another The complete cost function of the travel time may be:

$$g_{time}(n \mid n_0) = \lambda_{time}(t(n_0,n) + t_{add}(n_0,n)) \quad (14)$$

Equations (13) and (14) take equations (11) and (12) and separate them out to have the term, decompose it to have the time associated with the same lane time, and the additional cost for change lane time B.1.3. Step Cost: Risk The risk may be determined by the processor based on the current state of the traffic participant vehicle relative to the current state of the ego vehicle and an amount of vacillation associated with the traffic participant vehicle.

To balance out or compensate for the travel time savings against driving risk, the penalty on the risk may be evaluated by the processor. The risk may increase in two cases. First, when a physical distance to a neighboring vehicle is short (e.g., adjacency risk). Second, when a neighboring vehicle vacillates (e.g., uncertainty risk). In this regard, the processor may evaluate the overall risk based thereon.

The adjacency risk may be evaluated by the processor based on an inverse Euclidean distance, which leads the risk to increase exponentially as the distance decreases (e.g., the closer the ego vehicle to another vehicle, the more increased the risk). In this regard, at node n, the adjacency risk may be a closeness component:

$$r_{adj}(n) = \lambda_{adj} \sum_{i \in I_n} (d^2(n, Veh_i(t_n)))^{-1} \quad (15)$$

where $I_n$ denotes a set of vehicle indices on the same lane with node n, $Veh_i(t_n)$ denotes an estimated position of vehicle i at time $t_n$, and $t_n$ indicates travel time from the current measured position to node n. The adjacency risk may be indicative of an assessment of an overall risk associated with each lane, which enables the ego vehicle to choose a lane with less traffic density.

The uncertainty risk may be a measure of how volatile the other traffic participant vehicles are or may be indicative of an amount of variation detected by the sensors from the ego vehicle. For example, if a vehicle often has a hard break and/or a hard acceleration, the lane associated with this volatile vehicle may be not recommended to drive upon. In this case, another lane with multiple less volatile vehicles may be suggested by the processor. Gauging such uncertainty risk by entropy from information theory based on an empirical distribution of accelerations may be performed by the processor. The empirical distribution may be constructed based on real time observations (e.g., to adapt to real time changes) and applied Bayesian inferences may be performed to update a distribution with new observations. In this regard, the uncertainty risk may be a variation component:

$$r_{uncert}(n) = \lambda_{uncert} \sum_{i \in I_n} \frac{H(A_i)}{d^2(n, Veh_i(t_n))} \quad (16)$$

where H denotes an entropy function and $A_i$ denotes a discrete random variable for acceleration of vehicle i.

The risk cost may be the sum of the adjacency risk $r_{adj}(n)$ and uncertainty risk $r_{uncert}(n)$:

$$g_{risk}(n) = r_{adj}(n) + r_{uncert}(n) \quad (17)$$

B.1.4. Step Cost: Switching Cost

The switching cost may be determined by the processor based on a function of divergence of an initial position of the ego vehicle from a previous target lane. According to one aspect, consecutive lane changing may be not recommended, unless necessary for increased safety. For example, if a target lane is updated while changing lanes, this may result in a waving maneuver, which may be not recommended for both drive comfort and safety. The switching cost may be expressed as:

$$g_{switch}(n) = \Lambda_{switch}(\Delta) d(\tilde{y}_n, y_{*,prev}) \quad (18)$$

where $\Lambda_{switch}(\Delta)$ may be represented as a dynamic weight as a function of divergence of the initial ego vehicle position from the previous target lane, $\Delta$. This adaptive weight may be implemented to mitigate waving behavior (e.g., returning back to source in the middle of lane changing) resulting from the offset between the original and projected position of the ego vehicle, as discussed above. The dynamic weight may increase if the ego vehicle is changing lanes (i.e., $|\Delta|>0$), and the dynamic weight decreases if the ego vehicle finishes lane changing, (i.e., $|\Delta| \approx 0$).

$$\Lambda_{switch}(\Delta) = \lambda_{switch} \frac{|\Delta|}{l_{lane}} \quad (19)$$

Equation (19), the absolute value of $\Delta$ may be indicative of lane deviation. If the ego vehicle is in the center of the lane, regardless of whether the ego vehicle has accomplished the move or whether the ego vehicle has not started the move yet, that term would be 0 because the ego vehicle is in the center of the lane. As the ego vehicle moves out of the center of the lane, that term is going to become an increasing term or larger, thereby increasing the cost. In this way, the more complete an action, such as a lane change is performed, the more the ego vehicle may commit to that action, thereby reducing jitter associated with the decision making or lane selection.

A complete step cost may be calculated by the processor as the sum of each penalty function, (i.e., for node n inherited from no) as:

$$g(n|n_0;y_{*,prev}) = g_{control}(n|n_0) + g_{time}(n|n_0) + g_{risk}(n|n_0) + g_{switch}(n|n_0;y_{*,prev}) = Eq(6) + Eq(14) + Eq(17) + Eq(18) \quad (20)$$

In this way, the cost configuration may lack a hard constraint. Particularly, a collision may be treated as an additional travel cost and/or risk. The absence of the hard constraint ensures the algorithm always has a feasible solution to any search (i.e., a solution always exists). In addition to providing solution guarantees, this formulation by the processor positions the vehicle to only engage in the provably lowest cost interactions.

B.2. Heuristic Cost

One or more of the heuristic costs associated with each of the one or more adjacent nodes may be indicative of an estimated optimal cost-to-go to the goal position. In other words, the heuristic cost may be the lower bound on the cost or an idealistic cost which may be unachievable in the real world. According to one aspect, heuristic cost may represent an approximate optimal cost-to-go to the goal. In other words, the heuristic cost may be added in as long as it's a lower bounds on what the step cost will actually end up being, thereby enabling execution of the algorithm in a faster more computationally efficient manner. Therefore, the heuristic cost may be utilized to create a more computationally efficient lane selection.

For example, taking an analogy of travel from point A to point B on a map or in the real world, the heuristic may be a straight line distance from point A to point B. The step cost may account for any obstacles, such as buildings, or other traffic participant vehicles, etc. In this way, a path having the best or lowest cost may be determined. However, the best step cost may follow or obey one or more restrictions or constraints to mitigate collisions with obstacles and buildings in order to reach the goal. The heuristic cost may be a tool used to have the lane selection execute faster and may be any arbitrary number, which follows a set of rules. That set of rules may statistically be the lower bound of the true costs.

Given the geographical information, the heuristic cost h approximately measures the cost to go to the goal. The heuristic cost may be a lower bound that ignores risks and switching costs. Formally, for node n:

$$h(n) = \lambda_{goal} d(n, goal) \quad (21)$$

where the weight $\lambda_{goal}$ may adaptively increase as the ego vehicle moves closer to the goal point (e.g., highway exit), i.e., $$\lambda_{goal} \propto \left(\frac{1}{d(ego, goal)}\right).$$

In this way, the heuristic cost may be admissible, and hence the optimal path may be guaranteed. This is also true with variations of the termination criteria discussed herein.

C. Estimation of Traffic Participant Vehicle Position

Other vehicles may be moving obstacles. It may be useful to estimate the positions of the other vehicles at each space step (i.e., at each transition of the ego vehicle from one node to another), especially for precise evaluation of additional travel time cost from equation (14) and risk cost equation (17). The framework may be flexible with any prediction module or processor that outputs trajectory given observations regardless of its model. In other words, any prediction module Φ may be applicable that:

$$Veh_i(t_n) = \Phi(Veh_i(t_0), t_n) \quad (22)$$

where $Veh_i(t_0)$ denotes an initial position of vehicle i and $t_0$ may be a current time in measurement. Recall, $t_0$ may be a travel time to node n from the initial position $Veh_i(t_0)$. For instance, having a constant velocity model leads equation (22) to:

$$Veh_i(t_n) = (x_i, y_i)|_{t_n} = (x_{i0} + v_i \cos \Psi_i t_n, y_{i0} + v_i \sin \Psi_i t_n) \quad (23)$$

where $(x_{i0}, y_{i0})$ may be an initial position at $t_0$ and $\Psi_i$ may be an inertial heading angle of vehicle i relative to the road angle ψ. According to one aspect, more advanced prediction modules may be applied, such as Markov chain methods. Also, cooperative behaviors may be evaluated under this framework, using a prediction module that considers interactions between agents, such as social generative adversarial networks or graphical networks with intention reasoning.

D. Termination Criteria

Roughly speaking, the A* algorithm may terminate when a path reaches the goal position (i.e., $n = n_{goal}$). For example, in the case of driving on the highway, if an exit is positioned a few thousand meters away, the goal may be not within the search horizon. There may be multiple techniques to address this issue, such as projecting a goal to the nearest node within a search horizon. According to one aspect, the system may relieve the termination criteria by having multiple surrogate goals in the longitudinal end of lanes. The system may stop the algorithm when a path reaches at any end with a minimum cost (i.e., $n \in \{n_{goal,1}', \ldots n_{goal,N_{lane}}'\}$) where the superscript ' indicates a surrogate goal node. I will be appreciated that having surrogate goals may result in a longer or lengthier global path if the path from the surrogate goal to the true goal breaks optimality. However, in practice, the rolling horizon window may correct these types of errors before the ego vehicle reaches any sub optimal decision point. Any of the surrogate goals may be reachable, and hence no stopping criterion related to the failure to find a path.

E. Overview

Figure 7:
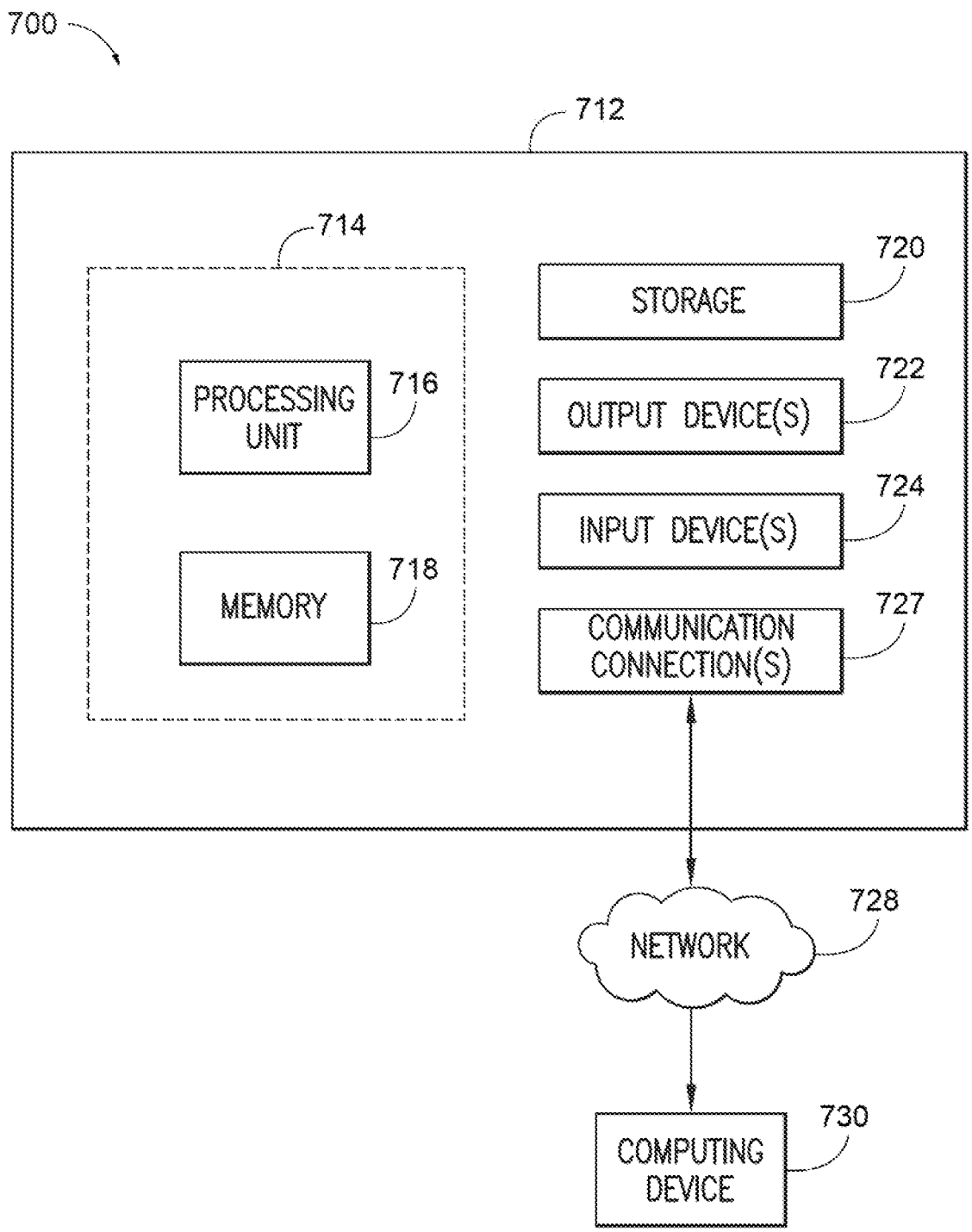
FIG. 7 is an illustration of an example computing environment where one or more of the provisions set forth herein are implemented, according to one aspect.

The components of FIG. 1 may be implemented via a processor and a memory, such as the processing unit 716 and memory 718 of FIG. 7. The processor may perform any of the calculations of any of the above described equations (e.g., equations (1)-(23), etc.). Further, the controller may control one or more vehicle systems to steer the ego vehicle from the current node to the subsequent node.

In brief, given a current node and goal node, A* finds a path by investigating nodes prioritized by low cost until a search reaches the goal node. With variations specifically for the lane selection problem.

Figure 2:
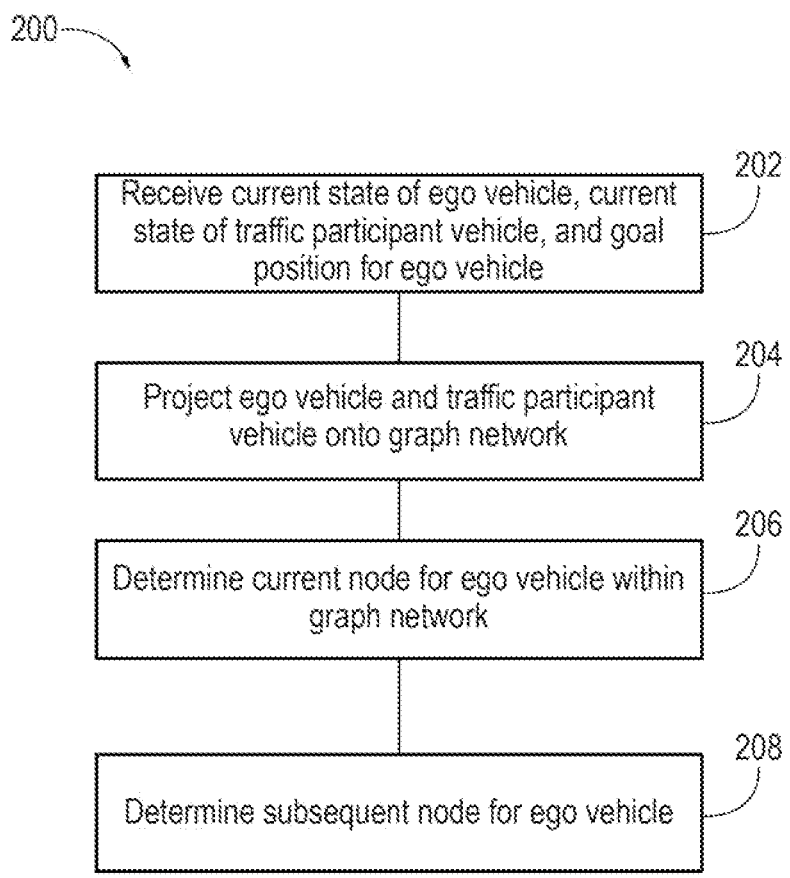
FIG. 2 is an exemplary flow diagram of a method for lane selection, according to one aspect.

FIG. 2 is an exemplary flow diagram of a method for lane selection, according to one aspect. According to one aspect, the method for lane selection may receive one or more inputs, including:

a current state of the ego vehicle, $(x_{ego}, y_{ego}, v_{ego})$;

a current state of vehicle i $(x_i, y_i, v_i, \Psi_i)$ for $i \in \{1, \ldots, N_{veh}\}$;

a lane j's center line trajectory $L_j$ for $j \in \{1, \ldots, N_{lane}\}$; and a goal position $(x_{goal}, y_{goal})$.

According to one aspect, the method for lane selection may generate an output of a sequence of nodes or path which may include one or more lane selections at one or more different times from the graph network based on the one or more inputs.

The method may include receiving 202 a current state of ego vehicle, current state of traffic participant vehicle, and goal position for ego vehicle, projecting 204 ego vehicle and traffic participant vehicle onto graph network, determining 206 current node for ego vehicle within graph network, and determining 208 subsequent node for ego vehicle. The receiving 202 and projecting 204 may include initializing a graph network G by projecting vehicles onto a relative space, along with a starting node to an open list $l_{open}$ indicative of nodes which are unprocessed and not yet considered by the lane selection method, algorithm, system. If any of the surrogate goals are in a closed list $l_{close}$, (i.e., if $n' \in l_{close}$ and indicative of nodes which are processed or already considered or visited by the lane selection method, algorithm, system), where $n' \in \{n_{goal,1}', \ldots n_{goal,N_{lane}}'\}$, the method may end.

The method may include repeating the following:

a) finding a node with lowest f from equation (5) and adding the node to the closed list $l_{closed}$ and setting the node added to the current node $n_0$; and b) for each adjacent node n:

ignoring the node if $n \notin G$ or $n \in l_{closed}$;

if $n \notin l_{open}$:

adding the node to $l_{open}$;

setting the current node $n_0$ to as a parent node $n_p$;

computing the travel time $t(n|n_0)$ from equation (8);

computing the total travel time $t_n = t n_0 + t(n|n_0)$;

predicting positions of other vehicles using equation (22), over $t_n$; and computing f from equation (5), g from equation (20), and h from equation (21), and recording $t_n$ (e.g., total time or full time).

if $n \in l_{open}$, updating $n_p$, f, g, h, and $t_n$ with a lower g. In other words, if the node is unprocessed or in open list, update the parent node and all the costs with a lower step cost.

A parent node leads to a child node or current node. Once there is a path, the parent node is utilized to recover the path that has been established. In other words, once the goal is reached, the system or method may include going to the parent of the goal, going from there to the parent of the goal's parent, and the parent of the goal's parent, all the way back to the start position, thereby tracing the path which is to be output.

Figure 3:
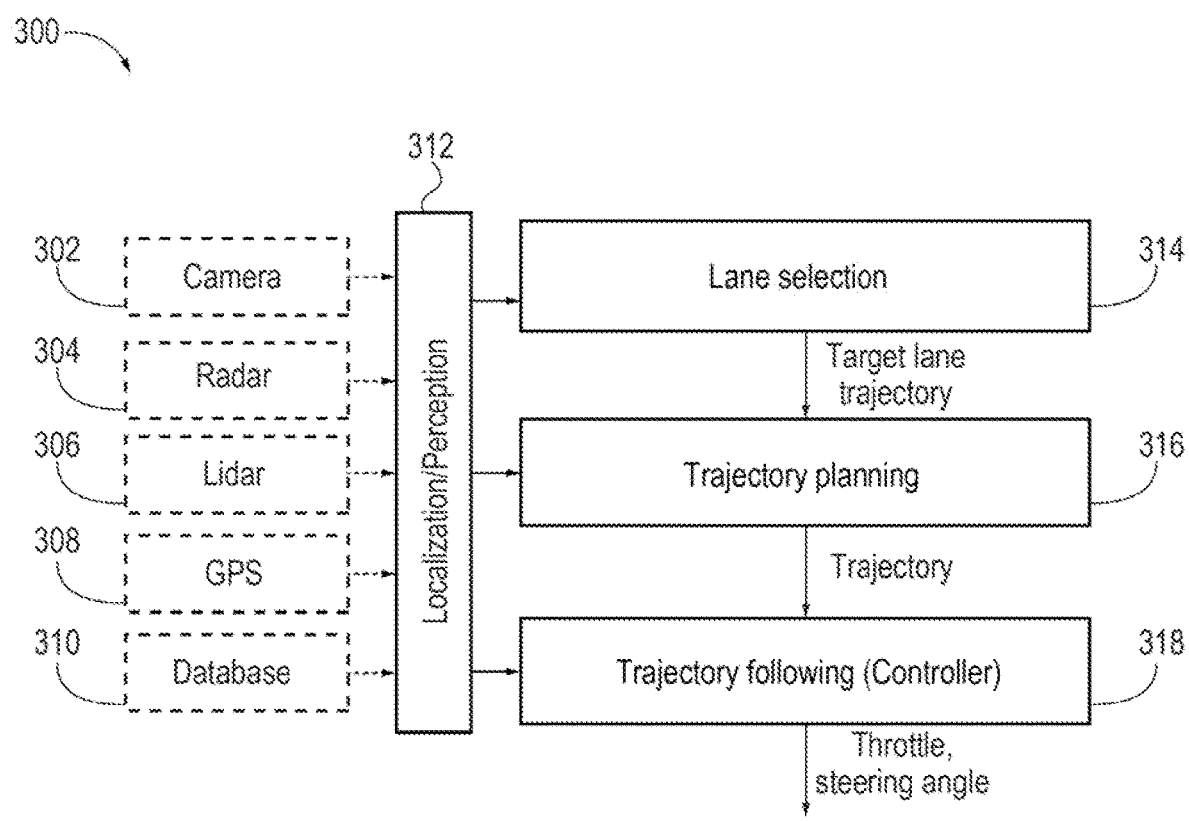
FIG. 3 is an exemplary component diagram of a system for lane selection, according to one aspect.

FIG. 3 is an exemplary component diagram of a system 300 for lane selection, according to one aspect. The system 300 for lane selection (e.g., which may be the lane selector) may include a pipeline associated with the lane changing. A variety of sensors and inputs may be provided to the system 300 for lane selection, such as images from a camera 302 or image capture device, radar data from a radar sensor 304, LIDAR data from a LIDAR sensor 306, global positioning system (GPS) data from a GPS device 308, or other data which may include GPS data from a database 310. A perception module 312 implemented via the processor may process the input data and feed this data to the system 300 for lane selection. The system 300 for lane selection may include three layers: (i) lane selector 314, (ii) trajectory planner 316, and (iii) trajectory follower 318. The system 100 for lane selection or the scenario runner 110 may include one or more of the camera 302, the radar sensor 304, the LIDAR sensor 306, the GPS device 308, etc. The database 310 may be in computer communication with the ROS bridge 130 and/or the system 100 for lane selection via one or more vehicle systems (e.g., a communication interface, etc.). The lane selector 150 may include the lane selector 314, and the controller 160 may include the trajectory planner 316. The trajectory follower 318 may be implemented via the controller 160, the real-time planner 162, and/or the real-time controller 164.

Given the geographical information of surrounding lanes, i.e., trajectory of center lines, a lane selector 314 may determine a target lane, considering traffic flow, risk, and travel time.

A center line trajectory of the determined target lane may be sent to the trajectory planner 316 from the lane selector 314, which may determine a smooth position trajectory to arrive at the target lane (i.e., motion planner). Finally, a trajectory follower 318 or controller may compute a throttle and a steering angle to track the smooth position trajectory (i.e., the controller). According to one aspect, the lane selector 314 may incorporate trajectory planning and trajectory follower algorithms.

The lane selector 314 or system for lane selection may utilize knowledge of perception and localization information, as well as the geographic information of lanes and an exit from the highway to achieve lane selection. Noises in localization and perception may or may not be considered according to one or more aspects.

Figure 4:
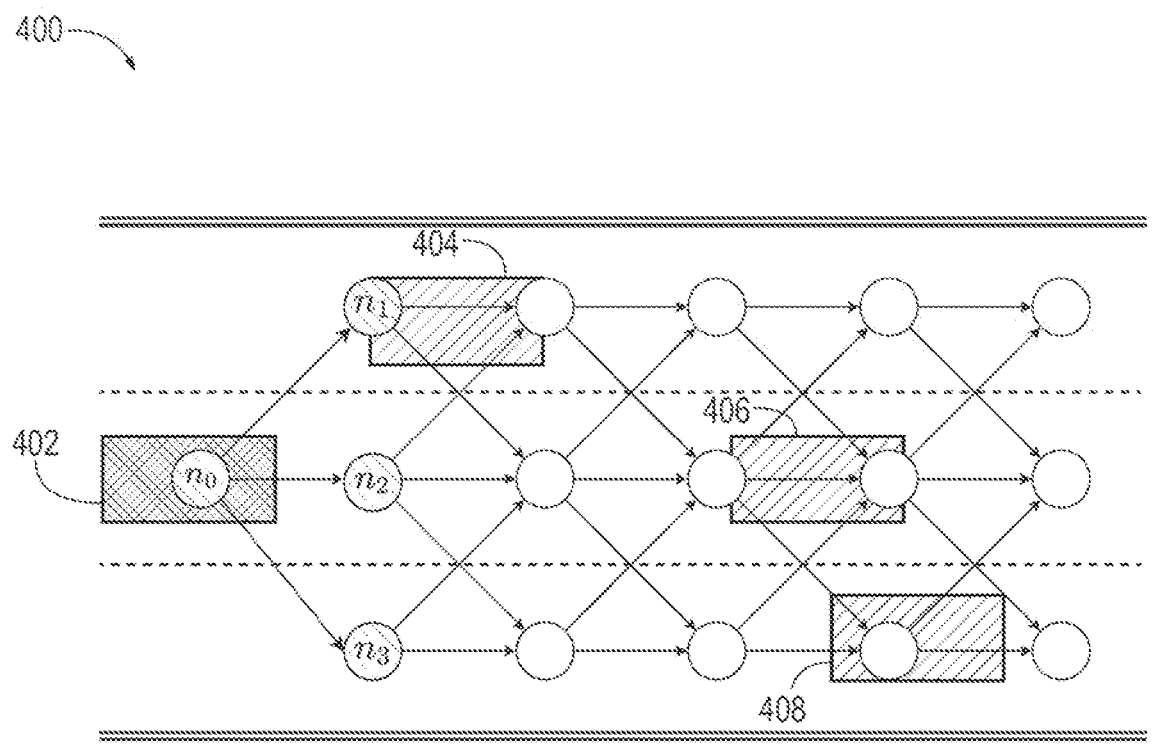
FIG. 4 is an exemplary scenario where the system for lane selection may be implemented, according to one aspect.

FIG. 4 is an exemplary scenario 400 where the system for lane selection may be implemented, according to one aspect. In FIG. 4, the processor may generate a graph where each node represents a position or potential position of the ego vehicle 402 (e.g., the autonomous vehicle being controlled) and each edge may represent a maneuver to move from one position or node to another. The nodes may be spatially and evenly distributed at a vertical level and a horizontal level.

As seen from the birds-eye-view of FIG. 4, the vertical level may correspond to lanes, with one row of nodes per lane, (i.e., a vertical step size=lane width). The horizontal nodes may be evenly distributed with a step size equivalent to a current speed for a fixed time step, (i.e., horizontal step size=current speed*time step). According to one aspect, the ego vehicle 402 may be positioned in a discrete space, while the other traffic participant vehicles 404, 406, 408 may be positioned in a continuous space.

Figure 5:
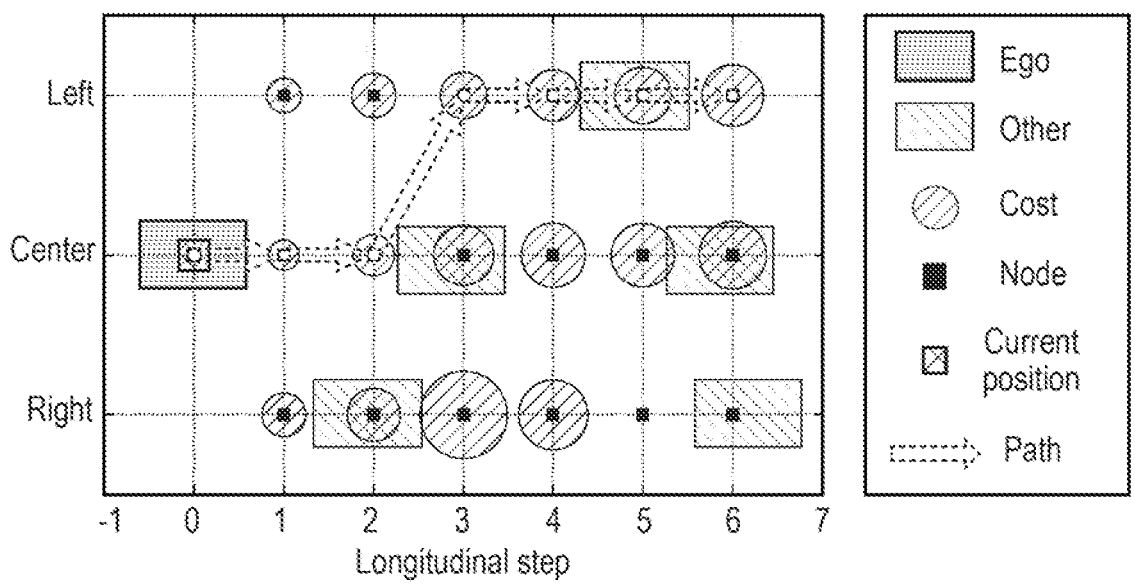
FIG. 5 is an exemplary scenario where the system for lane selection may be implemented, according to one aspect.

FIG. 5 is an exemplary scenario where the system for lane selection may be implemented, according to one aspect.

Figure 6:
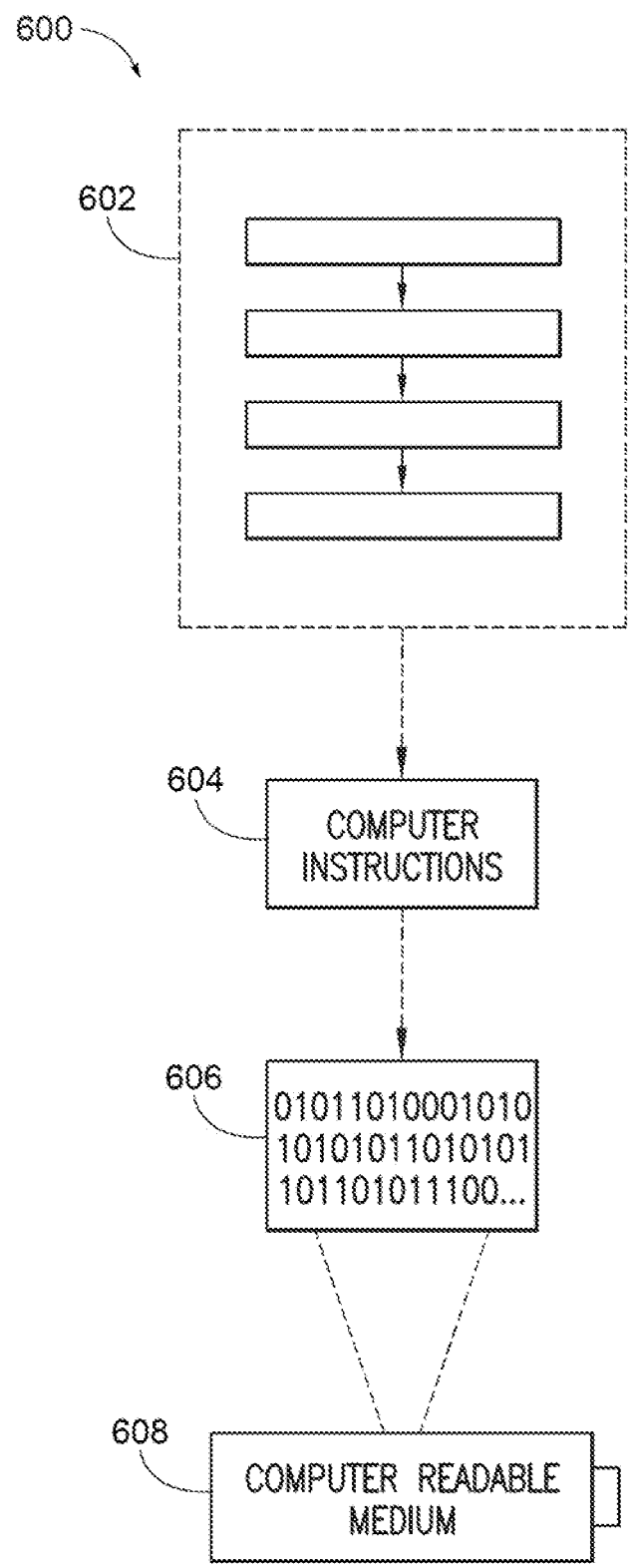
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 200 of FIG. 2. In another aspect, the processor-executable computer instructions 604 may be configured to implement a system, such as the system 100 of FIG. 1 or the system 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for lane selection, comprising:
an ego vehicle equipped with the system for lane selection and one or more vehicle systems;
a memory;
a processor coupled to the memory, the processor executing instructions stored in the memory, the instructions comprising:
receiving a current state of the ego vehicle, a current state of a traffic participant vehicle, and a goal position for the ego vehicle within an operating environment;
projecting the ego vehicle and the traffic participant vehicle onto a graph network based on the current state of the ego vehicle and the current state of the traffic participant vehicle, wherein one or more nodes of the graph network are indicative of discretized space within the operating environment;
determining a current node for the ego vehicle within the graph network; and
determining a subsequent node for the ego vehicle based on the following:
identifying one or more adjacent nodes which are adjacent to the current node;
calculating one or more travel times associated with each of the one or more adjacent nodes;
calculating one or more step costs associated with each of the one or more adjacent nodes;
calculating one or more heuristic costs associated with each of the one or more adjacent nodes; and
predicting a position of the traffic participant vehicle; and
a controller controlling the one or more vehicle systems to steer the ego vehicle from the current node to the subsequent node.

2. The system for lane selection of claim 1, wherein the instructions include determining the subsequent node for the ego vehicle based on calculating one or more total costs associated with each of the one or more adjacent nodes.

3. The system for lane selection of claim 2, wherein one or more total costs associated with each of the one or more adjacent nodes is a sum of one or more of the step costs associated with each of the one or more adjacent nodes and one or more of the heuristic costs associated with each of the one or more adjacent nodes, respectively.

4. The system for lane selection of claim 1, wherein one or more of the step costs associated with each of the one or more adjacent nodes is indicative of an immediate cost of transitioning from the current node to each of the one or more adjacent nodes, respectively.

5. The system for lane selection of claim 1, wherein one or more of the heuristic costs associated with each of the one or more adjacent nodes is indicative of an estimated optimal cost-to-go to the goal position.

6. The system for lane selection of claim 1, wherein one or more of the step costs associated with each of the one or more adjacent nodes includes a control effort, a travel time, a risk, and a switching cost.

7. The system for lane selection of claim 6, wherein the control effort is determined based on a Euclidean distance between the current node and the corresponding adjacent node onto a horizontal axis and a vertical axis.

8. The system for lane selection of claim 6, wherein the travel time is determined based on the current state of the ego vehicle including a current velocity of the ego vehicle.

9. The system for lane selection of claim 6, wherein the risk is determined based on the current state of the traffic participant vehicle relative to the current state of the ego vehicle and an amount of vacillation associated with the traffic participant vehicle.

10. The system for lane selection of claim 6, wherein the switching cost is determined based on a function of divergence of an initial position of the ego vehicle from a previous target lane.

11. A system for lane selection, comprising:
a memory;
a processor coupled to the memory, the processor executing instructions stored in the memory, the instructions comprising:
receiving a current state of an ego vehicle, a current state of a traffic participant vehicle, and a goal position for the ego vehicle within an operating environment;
projecting the ego vehicle and the traffic participant vehicle onto a graph network based on the current state of the ego vehicle and the current state of the traffic participant vehicle, wherein one or more nodes of the graph network are indicative of discretized space within the operating environment;
determining a current node for the ego vehicle within the graph network; and
determining a subsequent node for the ego vehicle based on the following:
identifying one or more adjacent nodes which are adjacent to the current node;
calculating one or more travel times associated with each of the one or more adjacent nodes;
calculating one or more step costs associated with each of the one or more adjacent nodes;
calculating one or more heuristic costs associated with each of the one or more adjacent nodes; and
predicting a position of the traffic participant vehicle; and
a controller controlling one or more vehicle systems to steer the ego vehicle from the current node to the subsequent node.

12. The system for lane selection of claim 11, wherein one or more of the step costs associated with each of the one or more adjacent nodes includes a control effort, a travel time, a risk, and a switching cost.

13. The system for lane selection of claim 12, wherein the control effort is determined based on a Euclidean distance between the current node and the corresponding adjacent node onto a horizontal axis and a vertical axis.

14. The system for lane selection of claim 12, wherein the travel time is determined based on the current state of the ego vehicle including a current velocity of the ego vehicle.

15. The system for lane selection of claim 12, wherein the risk is determined based on the current state of the traffic participant vehicle relative to the current state of the ego vehicle and an amount of vacillation associated with the traffic participant vehicle.

16. The system for lane selection of claim 12, wherein the switching cost is determined based on a function of divergence of an initial position of the ego vehicle from a previous target lane.

17. A computer-implemented method for lane selection, comprising:
  receiving a current state of an ego vehicle, a current state of a traffic participant vehicle, and a goal position for the ego vehicle within an operating environment;
  projecting the ego vehicle and the traffic participant vehicle onto a graph network based on the current state of the ego vehicle and the current state of the traffic participant vehicle, wherein one or more nodes of the graph network are indicative of discretized space within the operating environment;
  determining a current node for the ego vehicle within the graph network; and
  determining a subsequent node for the ego vehicle based on the following:
    identifying one or more adjacent nodes which are adjacent to the current node;
    calculating one or more travel times associated with each of the one or more adjacent nodes;
    calculating one or more step costs associated with each of the one or more adjacent nodes;
    calculating one or more heuristic costs associated with each of the one or more adjacent nodes
    predicting a position of the traffic participant vehicle; and
    controlling one or more vehicle systems to steer the ego vehicle from the current node to the subsequent node.

18. The method for lane selection of claim 17, comprising determining the subsequent node for the ego vehicle based on calculating one or more total costs associated with each of the one or more adjacent nodes.

19. The method for lane selection of claim 18, comprising determining one or more total costs associated with each of the one or more adjacent nodes as a sum of one or more of the step costs associated with each of the one or more adjacent nodes and one or more of the heuristic costs associated with each of the one or more adjacent nodes, respectively.

* * * * *